United States Patent [19]

Strock et al.

[11] Patent Number: 5,643,344
[45] Date of Patent: Jul. 1, 1997

[54] DRY SCRUBBER WITH FORCED RECIRCULATION

[75] Inventors: Thomas W. Strock, Jackson Township, Stark County; Paul Dykshoorn, Alliance, both of Ohio

[73] Assignee: The Babcock & Wilcox Company, New Orleans, La.

[21] Appl. No.: 388,332

[22] Filed: Feb. 14, 1995

[51] Int. Cl.⁶ ........................................ B01D 47/00
[52] U.S. Cl. .................. 55/226; 55/266; 55/419; 422/176; 423/243.08
[58] Field of Search ....................... 55/224, 226, 220, 55/261, 266, 419; 96/202; 261/78.2; 159/4.01, 4.02, 4.04; 422/176; 423/243.08

[56] References Cited

U.S. PATENT DOCUMENTS

| | | | |
|---|---|---|---|
| Re. 209,944 | 12/1939 | Baker | 55/226 |
| 970,654 | 9/1910 | Sepulchre | 95/204 |
| 2,436,038 | 2/1948 | Farrell | 55/220 |
| 2,578,315 | 12/1951 | Parker | 95/216 X |
| 2,729,301 | 1/1956 | Ekstrom, Jr. | 55/220 |
| 2,983,213 | 5/1961 | Bohanon | 55/261 |
| 3,681,895 | 8/1972 | Zirngibl et al. | 85/204 X |
| 3,988,421 | 10/1976 | Rinaldi | 55/226 |
| 4,105,591 | 8/1978 | Banks et al. | 252/466 J |
| 4,250,060 | 2/1981 | Banks et al. | 252/466 J |
| 4,251,236 | 2/1981 | Fattinger et al. | 55/84 |
| 4,338,292 | 7/1982 | Duranleau | 423/656 |
| 4,375,425 | 3/1983 | Duranleau et al. | 252/467 |
| 4,417,905 | 11/1983 | Banks et al. | 48/214 A |
| 4,473,438 | 9/1984 | Loureiro | 55/257.1 X |
| 4,481,171 | 11/1984 | Baran et al. | 55/230 X |
| 4,530,822 | 7/1985 | Ashley et al. | 55/230 X |
| 4,584,000 | 4/1986 | Guest | 95/235 X |
| 4,600,561 | 7/1986 | Frei | 55/222 X |
| 4,616,574 | 10/1986 | Abrams et al. | 110/343 |
| 4,623,523 | 11/1986 | Abrams et al. | 423/242 |
| 4,652,295 | 3/1987 | Alfrey | 71/43 |
| 4,682,991 | 7/1987 | Grethe et al. | 55/238 X |
| 4,784,841 | 11/1988 | Hartmann et al. | 423/613 |
| 4,795,619 | 1/1989 | Lerner | 423/244 |
| 4,874,400 | 10/1989 | Jury | 55/230 X |
| 4,874,478 | 10/1989 | Ishak et al. | 204/16 |
| 4,888,158 | 12/1989 | Downs | 423/242 |
| 4,975,257 | 12/1990 | Lin | 423/244 |
| 4,986,838 | 1/1991 | Johnsgard | 55/238 X |
| 5,194,076 | 3/1993 | Myers et al. | 55/220 |
| 5,215,557 | 6/1993 | Johnson et al. | 55/230 X |
| 5,354,364 | 10/1994 | Johnson et al. | 95/197 |

FOREIGN PATENT DOCUMENTS 694404  7/1953  United Kingdom ............ 55/224

Primary Examiner—C. Scott Bushey
Attorney, Agent, or Firm—Robert J. Edwards; Eric Marich

[57] ABSTRACT

A forced recirculation of a part of the untreated flue gas is established along the inside wall of a dry scrubber by providing a counterflowing gas flow along the length of a dry scrubber housing wall to prevent deposition of wet particulate material on the inside walls caused by recirculation of particulates and flue gas thereon.

13 Claims, 4 Drawing Sheets

DRY SCRUBBER WITH FORCED RECIRCULATION

FIELD AND BACKGROUND OF THE INVENTION

The present invention relates generally to the removal of sulfur oxides and other contaminants contained in a flue gas by spray drying or dry scrubbing. More particularly, it relates to an improved dry scrubbing apparatus which permits operation at or near the saturation temperature of the flue gas without deposition of the scrubbing particulates on the walls of the scrubbing apparatus.

The reduction of sulfur oxides and other contaminants contained in a flue gas formed during the combustion of coal/sulfur-bearing fossil fuels and waste materials is of the utmost concern to industry. These fuels are burned by electric power generating plants, waste recycling plants, and other industrial processes. There have been many attempts to comply with federal and state air pollution requirements which have included the treatment of the fuel to minimize sulfur as well as the treatment of the fuel combustion products to eliminate sulfur from the flue exhaust.

The obvious approach is to locate and utilize fossil fuels lower in sulfur content and/or other contaminants. The major disadvantage with this approach is the increased fuel and freight cost due to supply and demand and/or proximity to the end user of this fuel.

Another attempt in the reduction of the sulfur content in the fuel prior to combustion is to utilize mechanical and/or chemical processes which eliminate sulfur from the fuel. The major disadvantage with this approach is the cost effectiveness of the mechanical and/or chemical processing necessary to meet the required reduced levels of sulfur and/or other contaminants in the fuel.

The more acceptable approach has been to treat flue gas combustion products to remove sulfur while burning fuel that is high in sulfur content.

In one approach, dry pulverized alkali is injected directly into the hot combustion gases to remove sulfur oxides and other contaminants by way of chemical adsorption or absorption followed by oxidation. The major disadvantages with this approach is the low to moderate removal efficiencies, poor reagent utilization, and increased particulate loadings in the flue gas which necessitates the requirement for further flue gas conditioning (i.e., humidification) when the injection process is conducted upstream of a collection device such as an electrostatic precipitator (ESP).

Dry scrubbing is preferable to the above approach. In dry scrubbing, an aqueous alkaline solution or slurry is atomized via a mechanical, dual fluid, or rotary type atomizer and sprayed into hot flue gases downstream of particulate removal devices such as baghouses or electrostatic precipitators to remove sulfur oxides and other contaminants. The major disadvantage with this approach to date has been the limitation on spray down temperature. As the dry scrubbing apparatus approaches flue gas saturation temperature, the build up of particulates from the dried alkaline slurry on the walls of the dry scrubbing apparatus becomes severe.

One example of a known dry scrubber is shown in U.S. Pat. No. 5,194,076 to Myers et al., titled "Low Pressure Drop Dry Scrubber", assigned to The Babcock & Wilcox Company. Here the flue gas is treated by dry scrubbing with an aqueous alkaline solution or slurry which is finely atomized and sprayed into a hot flue gas. The atomized slurry droplets dry within the dry scrubber reactor and remove sulfur oxides. The resulting product is a low moisture, fine particulate that exits the dry scrubber via an outlet and is collected by a particulate collection device such as a baghouse, electrostatic precipitator, or other known means. This dry scrubber works in a commendable fashion for operation above flue gas saturation temperatures. However, when these saturation temperatures are approached the previously mentioned particulate deposition begins to occur on the reactor walls. Removal of this particulate build-up is a costly process, and requires the reactor to be shut down. Shut down requires either spare reactor modules, boiler and power generation shut down, or emissions which exceed regulations—alternatives that are unacceptable.

Another known dry scrubber is shown in U.S. Pat. No. 5,354,364 to Johnson et al., titled "High Efficiency Advanced Dry Scrubber", also assigned to The Babcock & Wilcox Company. Here, the apparatus and method for spraying a liquid into a flue gas provides a boundary layer of gas along a perimeter of a dry scrubber housing to prevent deposition of wet material on the sidewalls thereof. The boundary layer of gas includes the use of heated air, particulate free flue gas, and/or dust laden flue gas. As shown in FIGS. 4A and 4B thereof, and discussed at col. 4, lines 1–50, the boundary layer is preferably established by a plenum which is connected to a plurality of openings to provide the boundary layer gas flow on the inside surface and allow it to flow parallel with the sidewalls of the dry scrubber and prevent deposition thereon. As shown in FIG. 4A, the flue gas flow and the boundary layer flow are in the same direction. As shown in FIG. 4B, one method for mixing the heated boundary layer flow with the main flue gas stream, trip plates which may be either solid or perforated are provided to direct the boundary layer flow into the main flue gas stream.

The slurry and compressed air mixture exiting from the atomizers forms high velocity jets that have more momentum than the incoming flue gas. Since the atomizer mixture momentum is greater than the dry scrubber inlet flue gas momentum, it entrains the flue gas flow. This entrainment is desirable since it is the mechanism which intimately mixes the atomized slurry and flue gas flows together.

However, when the entrainment causes the flue gas to mix with the slurry jet, it reduces the jet velocity. If the jet is confined by the reactor walls, the jet may become starved and an insufficient amount of the flue gas will be available for entrainment. When this occurs, the jet attaches to the inside reactor walls and a recirculation zone or region forms in the flow field. This recirculation region recycles a mixture of the slurry (now partially dried) and the flue gas back towards the jet for re-entrainment. If the recirculating gas originates at a lower section of the dry scrubber reactor, it will contain mostly dry particulate which is unlikely to deposit on the reactor walls if the flow patterns remain stable. However, as efforts are made to improve dry scrubbing efficiencies (for example, operating when the outlet flue gas is at/or near saturation, and/or when the reactor walls are closer spaced, such as to reduce costs), the attachment point moves upward along the reactor walls and the particulate moisture content increases. This increases the probability that particulates will deposit on the reactor walls. In some circumstances, the recirculation pattern can become very small, and such flow patterns are unacceptable because they lead to an excessive amount of deposition on the reactor walls.

It is thus clear that preventing and avoiding particulate deposition is complicated by the flue gas and slurry flow patterns within the dry scrubber. A dry scrubber design that reduces or eliminates the above-identified recirculation region would be welcomed by the industry, since it would facilitate operation at temperatures at/or near saturation without excessive slurry particulate deposition on the reactor walls.

SUMMARY OF THE INVENTION

The present invention solves the aforementioned problems with the prior art dry scrubbers as well as others by providing a high efficiency advanced dry scrubber which operates at or near saturation temperature while minimizing or eliminating excessive alkali particulate deposition on the reactor inside walls. This is accomplished by providing a forced recirculation of flue gas along the length of the reactor inside walls which is opposite or counterflow to the direction of the slurry flow and the flow of the main portion of the flue gas. This counterflowing flue gas thus displaces the naturally occurring recirculating dry scrubber mixture at the walls of the reactor which would otherwise cause particulate deposition thereon.

Accordingly, one aspect of the present invention is drawn to an improved apparatus for spraying a liquid into a flue gas. The apparatus comprises a housing with an inlet for receiving the flue gas and an outlet for discharging the flue gas, the inlet of the housing being connected to a duct supplying a flue gas stream. A liquid source is connected to at least one atomizer positioned inside said housing for spraying a liquid from the liquid source into the flue gas stream for conditioning the flue gas. Finally, means are provided for supplying a counterflowing gas along the length of the inside walls of the housing in a direction opposite to that of the flow of liquid and flue gas through the housing for preventing deposition of wet material thereon.

Another aspect of the present invention is drawn to an improved method for spraying a liquid into a flue gas. The steps of this method comprise providing a housing with an inlet connected to a duct supplying a flue gas stream, and an outlet; positioning at least one atomizer in the housing for spraying a liquid into the flue gas passing therethrough to condition it; and supplying a flow of counterflowing flue gas along the length of the inside walls of said housing in a direction opposite to that of the flow of liquid and flue gas through the housing to prevent deposition of wet material thereon.

The various features of novelty which characterize the invention are pointed out with particularity in the claims annexed to and forming a part of this disclosure. For a better understanding of the invention, and the operating advantages attained by its uses, reference is made to the accompanying drawings and descriptive matter in which the preferred embodiment of the invention is illustrated.

DESCRIPTION OF THE PREFERRED EMBODIMENT

It is known that dry scrubber $SO_2$ removal efficiency and reagent utilization improves as the exiting gas temperature approaches saturation. It is also known that as the gas temperature approaches saturation, the particulates formed by the dry scrubbing reaction contain more moisture and are more susceptible to deposition on the dry scrubber reactor walls. Preventing and avoiding deposition problems is thus a major dry scrubber design consideration. Current dry scrubber development efforts are focused on improving $SO_2$ removal efficiency, as discussed above, and on reducing dry scrubber size and cost. These improvements increase the potential for deposition and can thus benefit from the deposition-free operation characteristics provided by the present invention.

Figure 1:
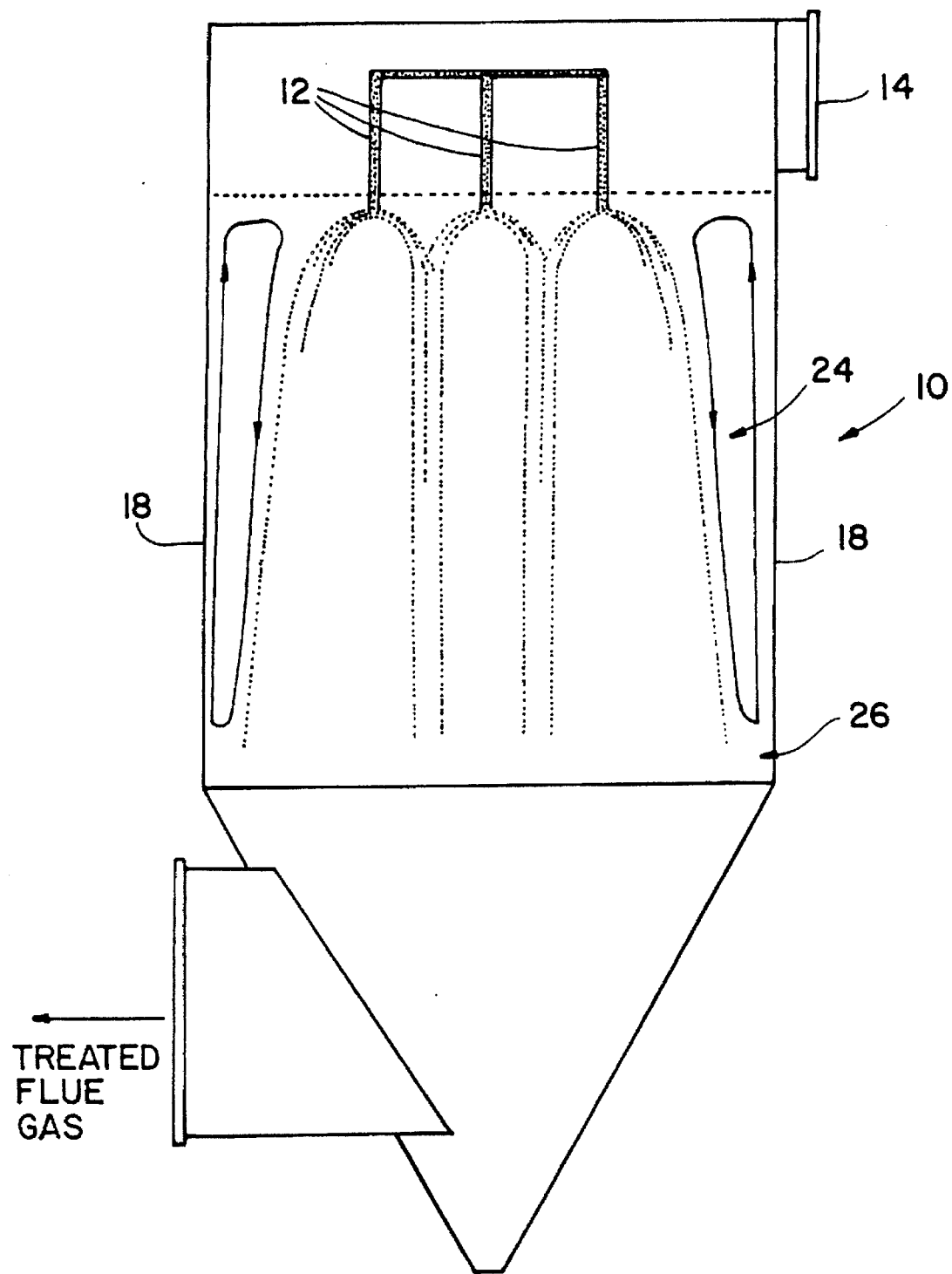
FIG. 1 is a schematic representation of a vertical down flow dry scrubber with an acceptable naturally occurring recirculating flow of particulates at the reactor walls.

Referring now to the drawings, wherein like numerals designate the same or functionally similar elements throughout the several drawings, and to FIG. 1 in particular, one aspect of the invention is drawn to a dry scrubbing reactor 10 with a single or multiple array of atomizers 12. While the dry scrubbing reactor 10 is shown as a vertical, co-current, downflow dry scrubber, it is understood that the present invention could be easily adapted to a vertical, co-current, upflow dry scrubber, as well as to a horizontally arranged dry scrubber. The atomizers 12 can be mechanical, dual fluid, or rotary type atomizers, all of which produce a homogeneous distribution of a finely atomized liquid such as an alkaline slurry in the flue gas stream. As is known in this art, the dry scrubber is connected by an inlet duct 14 to a combustion source (not shown) which produces flue gas that is conveyed into the dry scrubber 10 via inlet duct 14. An alkaline slurry is atomized and sprayed into the flue gas within the dry scrubber reactor 10. Dry scrubber 10 is usually located immediately upstream of a particulate collection device (also not shown).

The flue gas and slurry flow patterns within the dry scrubber 10 complicate preventing and avoiding particulate deposition on the inside walls 18 of the dry scrubber 10. As shown in FIG. 1, which depicts a typical, vertical, co-current downflow dry scrubber 10, the slurry and compressed air mixture exiting the dual-fluid atomizers 12 forms high velocity jets that have more momentum than the incoming flue gas. Momentum is proportional to the mixture density times the mixture velocity squared. This atomizer mixture momentum is greater than the dry scrubber reactor inlet flue gas momentum and thus entrains the flue gas flow. This entrainment is desirable since it is the mechanism which intimately mixes the atomized slurry and flue gas flows together. Similar atomizer mixture momentum can originate from either mechanical, dual-fluid, or rotary atomizers when used in conjunction with inlet distribution devices that accelerate the flue gas to the vicinity of the atomizer (i.e., Turbo Diffusers™).

Figure 2:
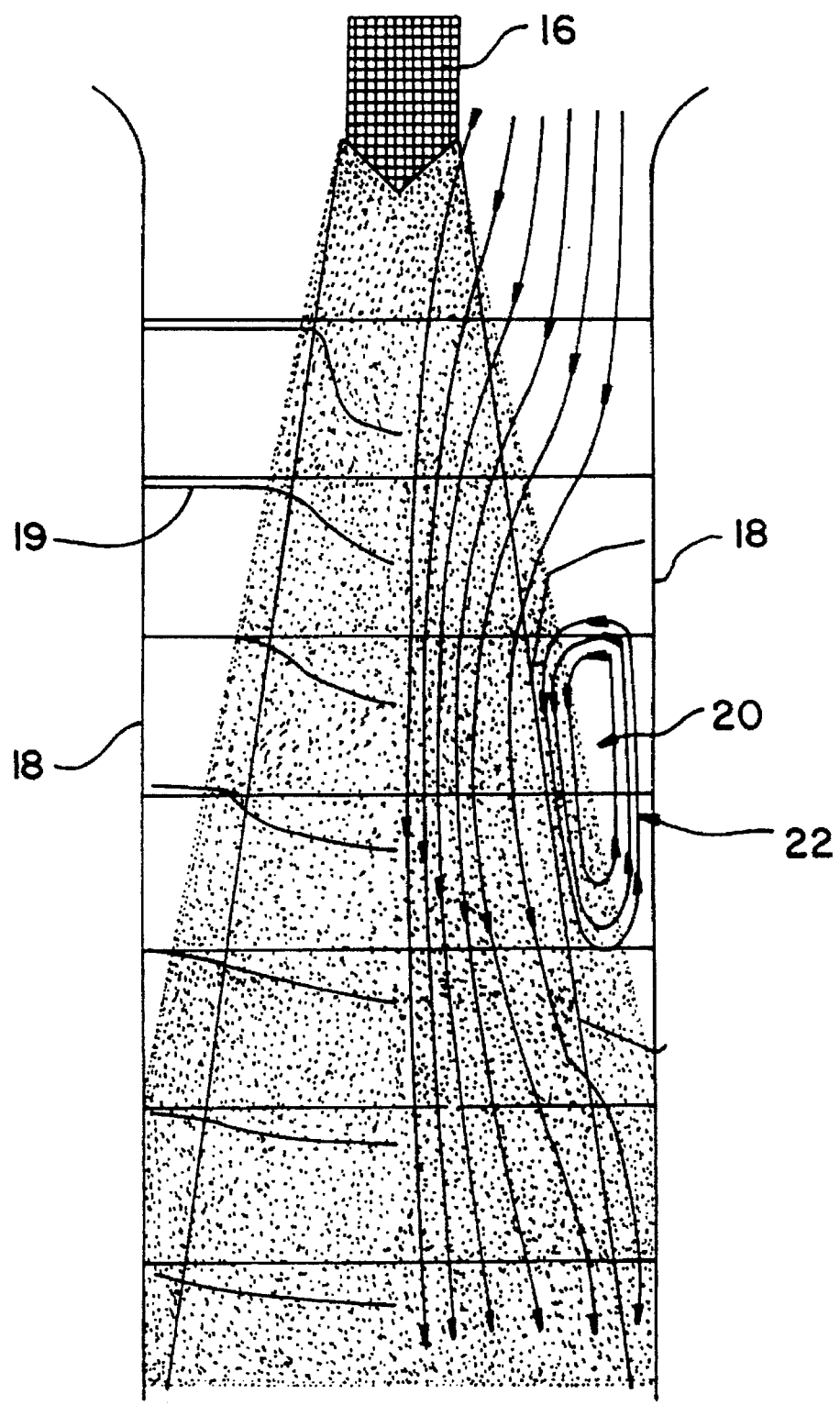
FIG. 2 is a schematic representation of a single atomizer jet exhibiting entrainment phenomena.

This entrainment phenomena, schematically illustrated in FIG. 2 for a generalized slurry jet 16, causes the flue gas to mix with the jet 16. This mixing process reduces the jet velocity 19. If the jet 16 is confined by reactor walls 18 the jet 16 may become starved and an insufficient amount of flue gas will be available for entrainment. When this occurs, the jet attaches to the walls 18 at an attachment point 20, forming recirculation zone 22 in the flow field. This recirculation region 22 recycles a mixture of the slurry (now partially dried) and the flue gas back towards the jet 16 for re-entrainment.

Figure 3:
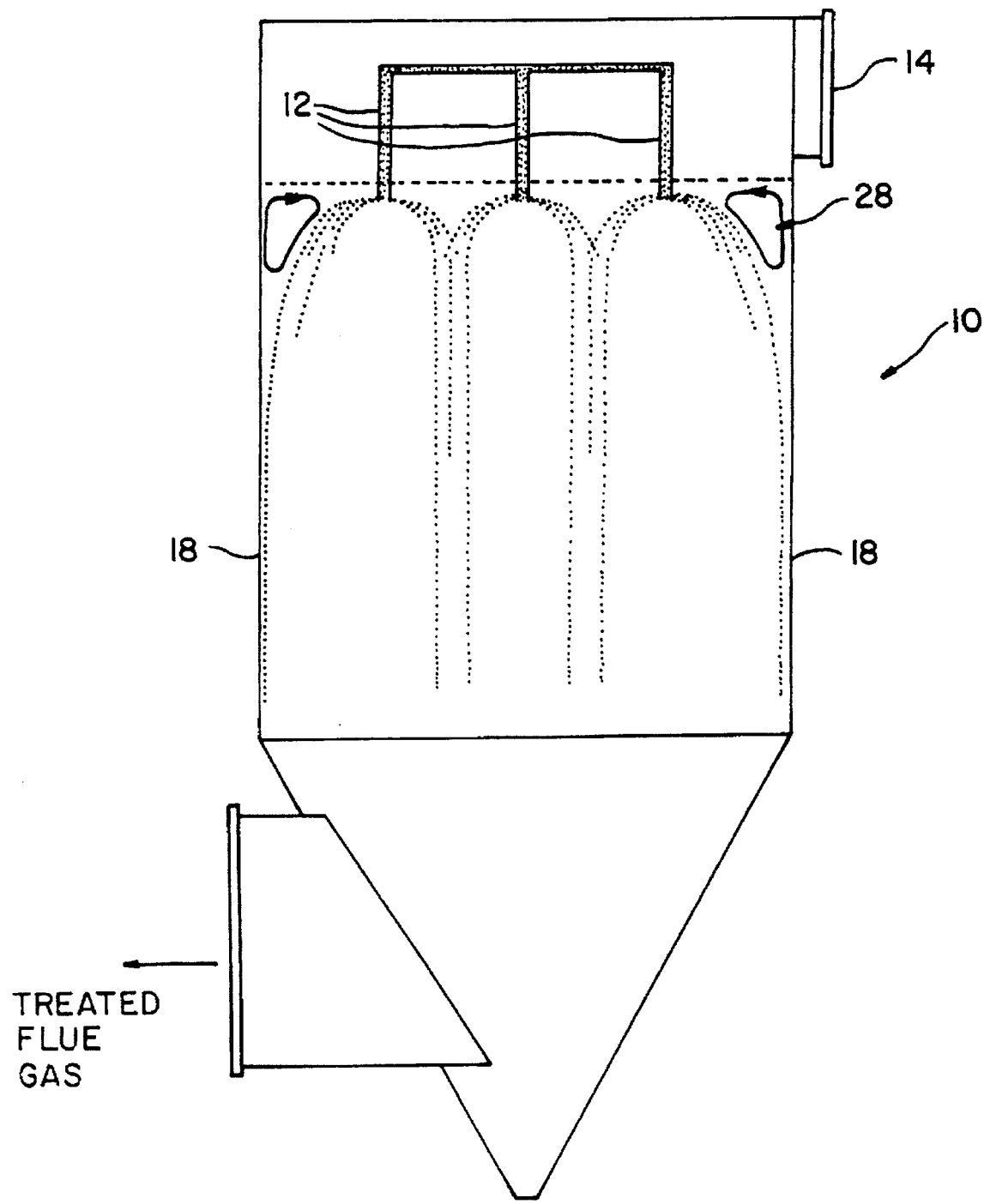
FIG. 3 is a schematic representation of a vertical down flow dry scrubber with unacceptable naturally occurring recirculating flow at the reactor walls which causes particulate deposition thereon.

In the dry scrubber reactor 10, this entrainment phenomena forms large natural recirculation zones or regions 24 as illustrated in FIG. 1. If the recirculating flue gas originates at a lower section 26 of the dry scrubber reactor 10, it will contain mostly dry particulate. This dry particulate is unlikely to deposit on the inside walls 18 if the flow patterns remain stable. However, as efforts are made to improve dry scrubbing efficiencies (for example, operating when the outlet flue gas is at/or near saturation temperature, and/or when the reactor walls 18 are closer spaced, such as to reduce costs), the attachment point 20 moves upward and the particulate moisture content increases. These factors increase the probability that particulates will deposit on the reactor inside walls 18. In some circumstances, such as when the dry scrubber design is not optimized, or during low load conditions, the recirculation pattern 28 can become very small, as illustrated in FIG. 3. These flow patterns are unacceptable since they lead to an excessive amount of deposition on the reactor inside walls 18.

Figure 4:
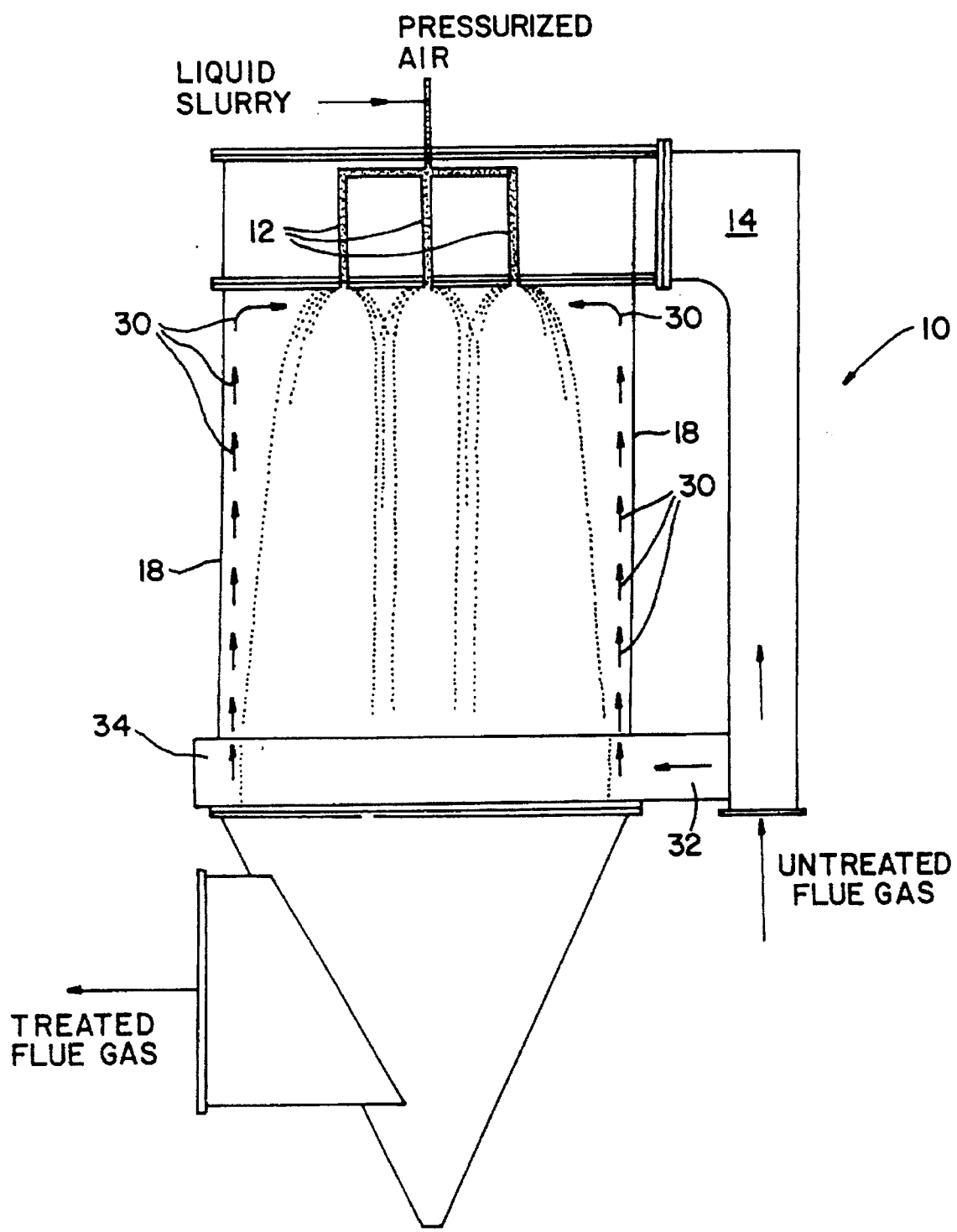
FIG. 4 is a schematic representation of a vertical down flow dry scrubber with forced recirculation flow along the length of the reactor walls according to the teachings of the present invention.

The present invention, as best seen in FIG. 4, provides a forced recirculation of the flue gas in the reactor by providing a counterflowing gas flow into the dry scrubber reactor 10, as shown by the arrows 30, that will replace or supplement the naturally occurring recirculating flow field described earlier in reference to FIGS. 1-3. The counterflowing gas flow is advantageously flue gas provided via a bypass flue gas line 32 connected to the dry scrubber inlet duct 14. A fraction (approximately 5% to 25% by weight) of the untreated, hot flue gas flows into the bypass flue 32 and into one or more annular manifolds 34 that at least partially surround the dry scrubber 10. This bypassed flue gas is directed upwards along the inside walls 18 of the dry scrubber 10 due to the higher pressure of the flue gas at bypass flue 32. If necessary, the flue gas pressure could be increased by a fan (not shown) contained in the bypass flue 32. This counterflowing gas flow continues upward along the inside walls 18 until it becomes entrained and mixes with the atomized slurry flow. Since this bypassed flue gas mixes with the slurry flow at the top of the dry scrubber 10, it will also be treated to remove the sulfur oxides and other contaminants along with the flue gas entering at the top of the dry scrubber 10 and provided via the inlet duct 14.

The fraction of the bypass flue gas flow, the discharge velocity upward, and the location of the one or more manifolds 34 may be established experimentally for each particular dry scrubber 10 design so long as a sufficient quantity of bypass flue gas is provided to maintain the upward counterflowing flue gas flow along the full height of the reactor inside walls 18 to maximize the benefits of the invention.

In view of the foregoing it will be seen that the advantages of this invention are as follows:

Hot, untreated, counterflowing flue gas flows along the dry scrubber reactor walls 18 to prevent the deposition of lower temperature, moisture laden particulate on the walls 18. The dry scrubber 10 can then be operated at/or near the flue gas saturation temperature to further increase removal efficiencies and reagent utilization.

The counterflowing hot flue gas flow replaces the naturally occurring recirculating flow field established by the atomized slurry flow entrainment. This forced recirculation flow field will be more stable and lower the potential for deposition problems in comparison to a naturally recirculating flow field, and could be especially helpful at low load dry scrubber conditions.

The counterflowing hot flue gas will heat the inside walls 18 of the dry scrubber 10. This will quickly dry any deposits that may reach the inside walls 18 during an upset condition. The dry deposits will flake off in the hot flue gas flow. The heated inside walls 18 will also prevent condensation of the near saturation temperature outlet flue gas on otherwise unheated/uninsulated walls.

The counterflowing flue gas flowing along the dry scrubber walls 18 is eventually entrained into the main stream of flue gas and atomized slurry and therefore leaves the dry scrubber 10 in a treated condition.

The atomizer to wall spacing can be decreased to provide better spray coverage and reduce the diameter of the dry scrubber 10 as compared to a dry scrubber 10 without forced recirculation.

The forced recirculation concept of the present invention can be used with dry scrubbers that use dual-fluid atomizers and dry scrubbers 10 that incorporate Turbo Diffusers™ around the dual-fluid atomizers. Furthermore, the invention is useful for all inlet distribution devices and outlet flue designs.

This invention can be used with cylindrical or rectangular shaped dry scrubbers 10.

This invention can also be used in vertical downflow or horizontal flow arrangements.

There are no moving parts to operate or maintain.

While specific embodiments of the invention have been shown and described in detail to illustrate the applications and principles of the invention, certain modifications and improvements will occur to those skilled in the art upon reading the foregoing description. By way of example and not limitation, the counterflowing flue gas could be replaced by alternative fluids such as heated air, particulate-free flue gas, or reheated treated flue gas. It is thus understood that all such modifications and improvements have been deleted herein for the sake of conciseness and readability, but are properly within the scope of the following claims.

We claim:

1. An improved dry scrubber apparatus for spraying a liquid into a flue gas, comprising:

a housing with an inlet for receiving the flue gas and an outlet for discharging the flue gas, said inlet of said housing being connected to a duct for supplying a flue gas stream;

a liquid source connected to at least one atomizer positioned inside said housing for spraying a liquid from said liquid source into the flue gas stream for conditioning the flue gas, the sprayed liquid entraining the flue gas and intimately mixing the liquid and the flue gas together; and means for supplying a counterflowing gas along a length of inside walls of said housing in a direction opposite to that of the flow of liquid and flue gas through said housing, the counterflowing gas displacing a naturally occurring recirculating flow field which occurs at the inside walls of said housing due to said entrainment for preventing deposition of wet material on the inside walls.

2. The improved apparatus of claim 1, wherein the counterflowing gas is flue gas and said means for supplying a counterflowing gas includes a manifold connected to said duct to provide flue gas to said manifold.

3. The improved apparatus of claim 2, wherein said manifold is connected to said housing to direct the counterflowing flue gas upwardly along the length of the inside walls of said housing.

4. The improved apparatus of claim 2, wherein said manifold provides an amount of counterflowing flue gas equal to approximately 5% to 25%, by weight, of an amount of flue gas supplied to the inlet of said housing.

5. The improved apparatus of claim 1, wherein said apparatus is a dry scrubber operating at or near a saturation temperature of the flue gas entering said scrubber.

6. The improved apparatus of claim 1, wherein said liquid source is an alkaline slurry.

7. The improved apparatus of claim 1, wherein said atomizer is further connected to a pressurized air source.

8. The improved apparatus of claim 1, wherein the counterflowing gas is a member selected from the group consisting of heated air, particulate-free flue gas, and reheated treated flue gas.

9. An improved vertical, co-current, dry scrubber apparatus for spraying a liquid into a flue gas, comprising:

a housing with an inlet for receiving the flue gas and an outlet for discharging the flue gas, said inlet of said housing being connected to a duct for supplying a flue gas stream;

at least one atomizer positioned inside said housing for atomizing and spraying a jet of liquid alkaline slurry into the flue gas stream which entrains the flue gas stream and intimately mixes the liquid alkaline slurry and the flue gas stream together for conditioning the flue gas stream; and means for supplying a counterflowing flue gas flow along a length of inside walls of said housing in a direction opposite to that of the flow of liquid and flue gas through said housing to displace a naturally occurring recirculating flow field which occurs at the inside walls of said housing due to said entrainment for preventing deposition of wet material on the inside walls.

10. The improved apparatus of claim 9, wherein the means for supplying the counterflowing flue gas flow comprises a manifold connected to said duct to provide flue gas to said manifold.

11. The improved apparatus of claim 10, wherein said dry scrubber apparatus is a vertical, co-current, downflow dry scrubber apparatus and wherein said manifold is connected to said housing to direct the counterflowing flue gas upwardly along the inside walls of the dry scrubber apparatus until it becomes entrained and mixes with the atomized slurry flow at a top of the dry scrubber apparatus.

12. The improved apparatus of claim 11, wherein said manifold provides an amount of counterflowing flue gas equal to approximately 5% to 25%, by weight, of an amount of flue gas supplied to the inlet of said housing.

13. An improved vertical, co-current, downflow, dry scrubber apparatus for spraying a liquid into a flue gas, comprising:

a housing with an inlet for receiving the flue gas and an outlet for discharging the flue gas, said inlet of said housing being connected to a duct for supplying a flue gas stream;

at least one atomizer positioned inside said housing for atomizing and spraying a jet of liquid alkaline slurry into the flue gas stream which entrains the flue gas stream and intimately mixes the liquid alkaline slurry and the flue gas stream together for conditioning the flue gas stream; and means for supplying an amount of counterflowing flue gas equal to approximately 5% to 25%, by weight, of an amount of flue gas supplied to the inlet of said housing upwardly along a length of the inside walls of said housing in a direction opposite to that of the flow of liquid and flue gas through said housing to displace a naturally occurring recirculating flow field which occurs at a top of the dry scrubber apparatus at the inside walls of said housing due to said entrainment, the counterflowing flue gas flow becoming entrained and mixing with the atomized slurry flow for preventing deposition of wet material on the inside walls.

* * * * *